(12) United States Patent
Yadav et al.

(10) Patent No.: US 7,613,213 B2
(45) Date of Patent: Nov. 3, 2009

(54) TIME MULTIPLEXED SONET LINE PROCESSING

(75) Inventors: Pushkal Yadav, New Delhi (IN); Kumar Shakti Singh, New Delhi (IN); Chitra Wadhwa, Sonepat (IN); Sachin Mathur, Bangalore (IN); Ashis Maitra, New Delhi (IN); Amandeep Singh Gujral, Pune (IN); Diljit Singh, Faridabad (IN); Yudhishthira Kundu, Faridabad (IN)

(73) Assignee: Transwitch Corporation, Shelton, CT (US)

( * ) Notice: Subject to any disclaimer, the term of this patent is extended or adjusted under 35 U.S.C. 154(b) by 616 days.

(21) Appl. No.: 11/209,230

(22) Filed: Aug. 23, 2005

(65) Prior Publication Data
US 2006/0039416 A1   Feb. 23, 2006

Related U.S. Application Data

(60) Provisional application No. 60/603,620, filed on Aug. 23, 2004.

(51) Int. Cl.
*H04J 3/02* (2006.01)
(52) U.S. Cl. .................................. 370/539
(58) Field of Classification Search ............ 370/539, 370/537
See application file for complete search history.

(56) References Cited

U.S. PATENT DOCUMENTS

| | | | |
|---|---|---|---|
| 3,982,077 A | 9/1976 | Clark et al. | |
| 4,375,681 A | 3/1983 | Abbott et al. | |
| 4,460,993 A | 7/1984 | Hampton et al. | |
| 4,488,293 A | 12/1984 | Haussmann et al. | |
| 4,660,169 A | 4/1987 | Norgren et al. | |
| 4,685,101 A | 8/1987 | Segal et al. | |
| 4,727,536 A | 2/1988 | Reeves et al. | |
| 4,750,168 A | 6/1988 | Trevitt | |
| 4,815,074 A | 3/1989 | Jacobsen | |
| 5,048,012 A | 9/1991 | Gulick et al. | |
| 5,276,678 A | 1/1994 | Hendrickson et al. | |
| 5,835,543 A | 11/1998 | Mazzurco et al. | |
| 5,893,162 A | 4/1999 | Lau et al. | |
| 6,765,933 B1 * | 7/2004 | Michel et al. | 370/539 |
| 6,816,509 B2 * | 11/2004 | Pelley et al. | 370/466 |
| 6,982,995 B2 | 1/2006 | Acimovic | |

OTHER PUBLICATIONS

R.Clauberg, Data aggregation architectures for single-chip SDH/SONET framers, Feb. 27, 2003, IBM Journal of Research and Development, vol. 47, pp. 1-11.*

* cited by examiner

*Primary Examiner*—Derrick W Ferris
*Assistant Examiner*—Angel Brockman
(74) *Attorney, Agent, or Firm*—Gordon & Jacobson, PC

(57) ABSTRACT

Time multiplexed processing of multiple SONET signals uses the same shared circuitry for framing, descrambling, maintenance signal processing, control byte processing and extraction, pointer tracking, retiming, and alarm indication. The signals are deserialized and multiplexed onto a byte-wide bus from which they are processed in a shared pipeline. Additional pipelines allow scaling up to higher capacity SONET signals. Each pipeline is provided with means for communicating with the other pipelines so that information derived from the processing of one stream can be shared with the processing of other streams when necessary. According to the presently preferred embodiment, bytes pass through the pipeline in five clock cycles.

21 Claims, 14 Drawing Sheets

TIME MULTIPLEXED SONET LINE PROCESSING

CROSS-REFERENCE TO RELATED APPLICATIONS

This application claims benefits from U.S. Provisional Patent Application No. 60/603,620, filed Aug. 23, 2004, the contents of which are hereby incorporated herein by reference.

This application is related co-owned application Ser. No. 10/094,768, filed Mar. 11, 2002, entitled "Desynchronizer Having RAM Based Shared Digital Phase Locked Loops and SONET High Density Demapper Incorporating Same," published Sep. 11, 2003, the complete disclosure of which is hereby incorporated herein by reference.

BACKGROUND OF THE INVENTION

1. Field of the Invention

This invention relates broadly to telecommunications. More particularly, this invention relates to the Synchronous Optical Network (SONET) and to the processing of multiple SONET signals with shared circuits.

2. State of the Art

The Synchronous Optical Network (SONET) or the Synchronous Digital Hierarchy (SDH), as it is known in Europe, is a common telecommunications transport scheme which is designed to accommodate both DS-1 (T1) and E1 traffic as well as multiples (DS-3 and E-3) thereof. A DS-1 signal consists of up to twenty-four time division multiplexed DS-0 signals plus an overhead bit. Each DS-0 signal is a 64 kb/s signal and is the smallest allocation of bandwidth in the digital network, i.e. sufficient for a single telephone connection. An E1 signal consists of up to thirty-two time division multiplexed DS-0 signals with at least one of the DS-0s carrying overhead information.

Developed in the early 1980s, SONET has a base (STS-1) rate of 51.84 Mbit/sec in North America. The STS-1 signal can accommodate 28 DS-1 signals or 21 E1 signals or a combination of both. The basic STS-1 signal has a frame length of 125 microseconds (8,000 frames per second) and is organized as a frame of 810 octets (9 rows by 90 byte-wide columns). It will be appreciated that 8,000 frames*810 octets per frame*8 bits per octet=51.84 Mbit/sec.

In Europe, the base (STM-1) rate is 155.520 Mbit/sec, equivalent to the North American STS-3 rate (3*51.84=155.520). The STS-3 (STM-1) signals can accommodate 3 DS-3 signals or 63 E1 signals or 84 DS-1 signals, or a combination of them. The STS-12 signals are 622.080 Mbps and can accommodate 12 DS-3 signals, etc. The STS-48 signals are 2,488.320 Mbps and can accommodate 48 DS-3 signals, etc. The highest defined STS signal, the STS-768, is nearly 40 Gbps (gigabits per second). The abbreviation STS stands for Synchronous Transport Signal and the abbreviation STM stands for Synchronous Transport Module. STS-n signals are also referred to as Optical Carrier (OC-n) signals when transported optically rather than electrically.

Processing of a SONET signal requires many sequential operations before the data can be extracted. These operations, which are illustrated schematically in prior art FIG. 1, include: byte alignment and framing, Section TOH/RSOH processing (i.e. descrambling and B1 processing), maintenance signal processing (including signal fail alarm indications), Line TOH/MSOH processing (B2 processing and maintenance signals), pointer tracking, and retiming. Recently, it has become desirable to process multiple distinct SONET signals with a single chip or chipset. This requires multiplication of the circuits used for framing, descrambling, maintenance signal processing, control byte processing and extraction, pointer tracking, retiming, and alarm indication.

The previously incorporated related application discloses methods and apparatus for minimizing the multiplication of framing circuitry.

SUMMARY OF THE INVENTION

It is therefore an object of the invention to provide methods and apparatus for virtually concurrently processing multiple SONET signals.

It is another object of the invention to provide methods and apparatus for virtually concurrently processing multiple SONET signals with a minimum amount of hardware.

It is a further object of the invention to provide methods and apparatus which are scalable and modular for virtually concurrently processing multiple SONET signals.

It is also an object of the invention to provide methods and apparatus for processing multiple SONET signals virtually concurrently which are configurable for different combinations of different types of SONET signals.

In accord with these objects, which will be discussed in detail below, the methods of the present invention include time multiplexed processing of multiple SONET signals with the same shared circuitry for framing, descrambling, maintenance signal processing, control byte processing and extraction, pointer tracking, retiming, and alarm indication. According to the presently preferred embodiment, up to forty-eight STS-1 signals (or the equivalent bandwidth of higher order signals, such as four STS-12 signals, sixteen STS-3 signals, etc., or mixtures of different order STS signals) are processed virtually concurrently using shared circuits. The signals are deserialized and multiplexed onto a byte-wide bus. Depending on the input signal and the target demultiplexed STS signals on the output bus, signals are processed in up to sixteen pipelines (processing blocks), each of which is shared by up to twelve STS-1 streams. Each pipeline is comprised of a single set of circuits which is shared by multiple STS streams. Each pipeline is provided with means for communicating with the other pipelines so that information derived from the processing of one stream can be shared with the processing of other streams when necessary, e.g. when multiple pipelines are used to process a single signal. According to the presently preferred embodiment, bytes pass through the pipeline in five clock cycles. Exemplary hardware embodiments include one having four parallel pipelines, each processing twelve STS-1 signals (from an OC-48 signal, four OC-12 signals, sixteen OC-3 signals, or forty-eight OC-1 signals) and one having sixteen parallel pipelines, each processing twelve STS-1 signals (from an OC-192 signal or multiple lower order signals). According to the presently preferred embodiment, the apparatus is embodied on a single integrated circuit chip.

Additional objects and advantages of the invention will become apparent to those skilled in the art upon reference to the detailed description taken in conjunction with the provided figures.

BRIEF DESCRIPTION OF THE DRAWINGS

FIG. 9A is a flow chart illustrating the function of the circuit of FIG. 9;

DETAILED DESCRIPTION OF THE PREFERRED EMBODIMENT

Figure 1:
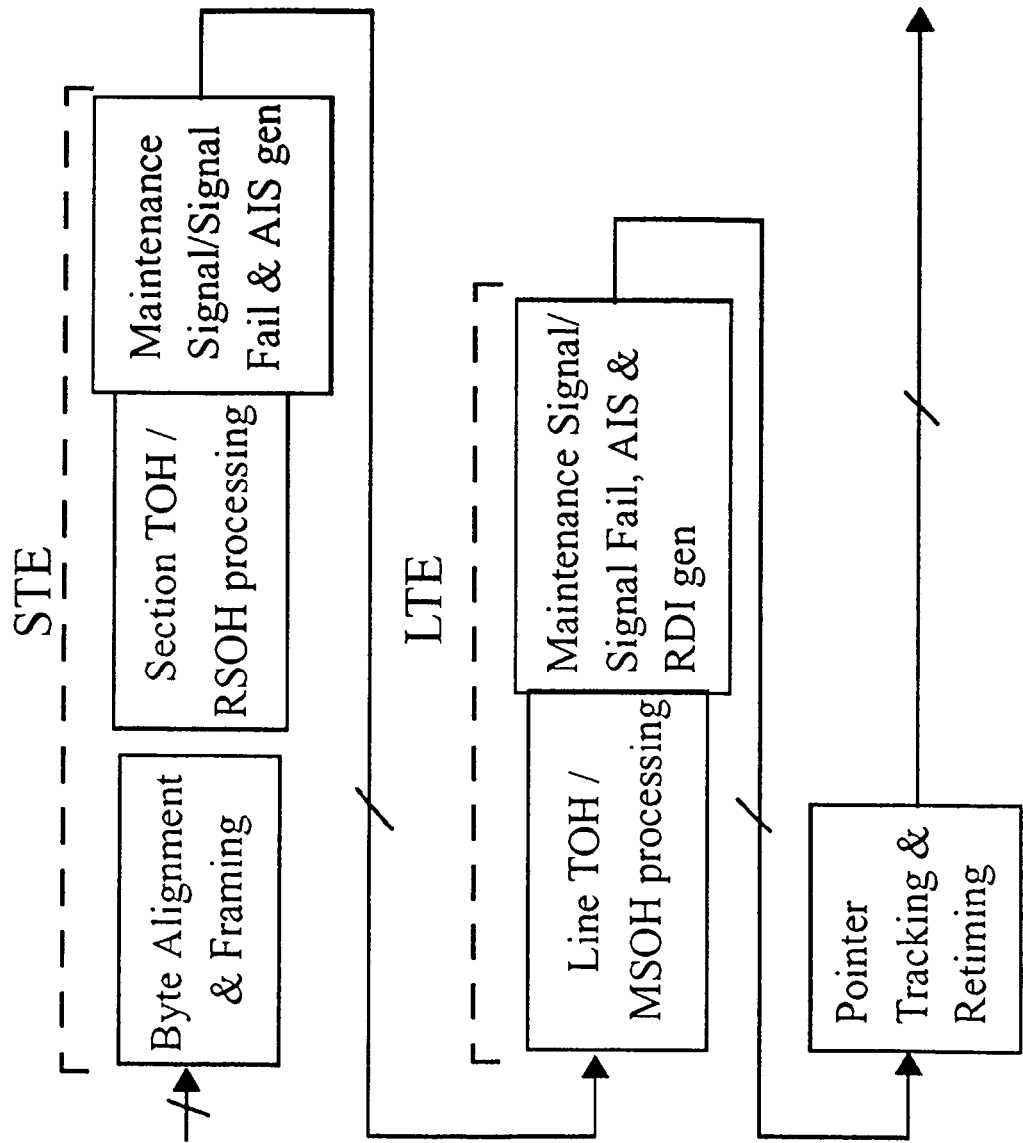
FIG. 1 is a prior art block diagram of the processes involved on the receive side of section terminating equipment and line terminating equipment for processing an incoming SONET signal.
Figure 2:
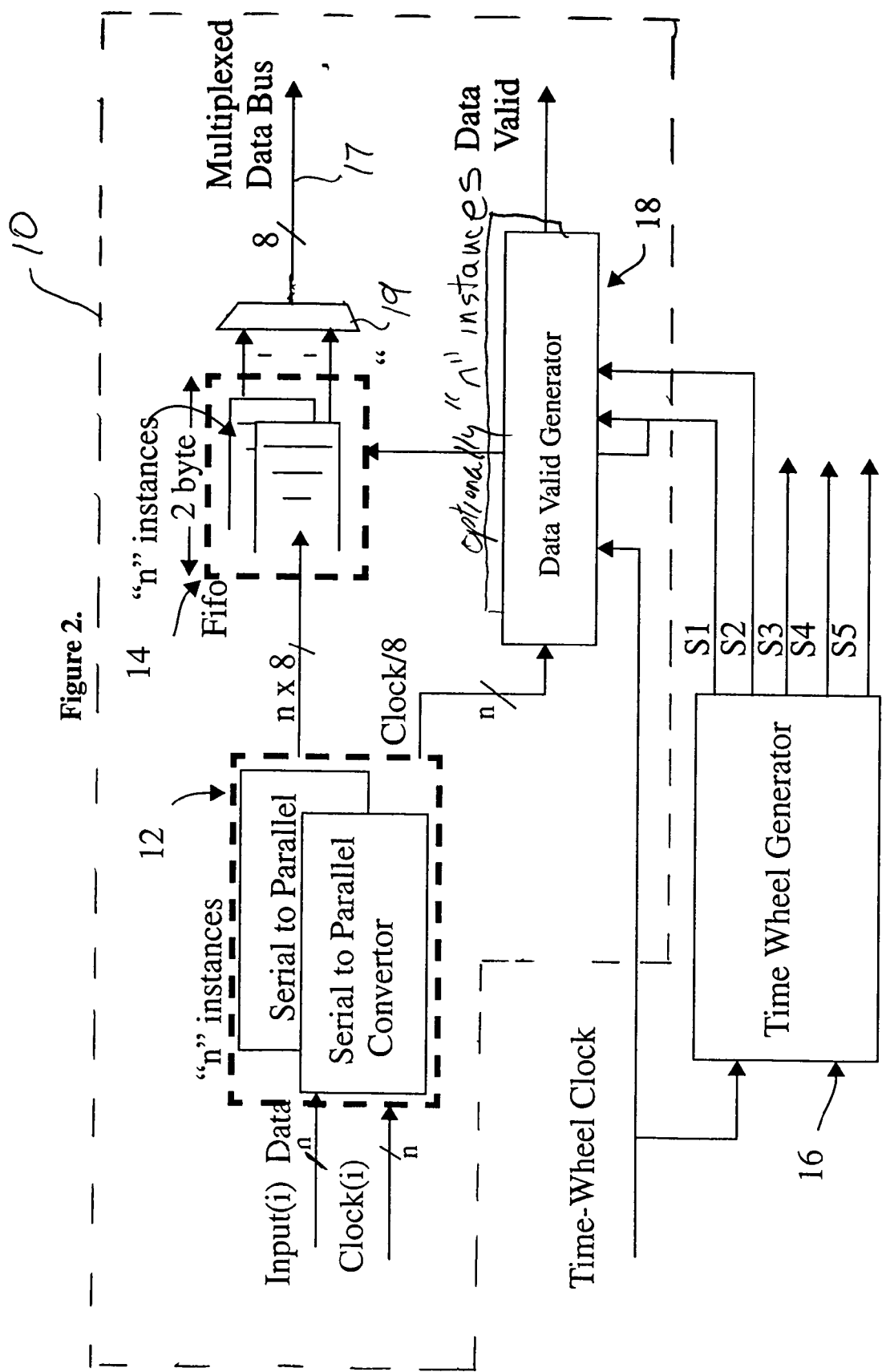
FIG. 2 is a high level block diagram of a first circuit in the pipeline of the invention in which multiple SONET signals are deserialized and multiplexed using a time wheel clock.

Turning now to FIG. 2, the first circuit 10 in the pipeline of the invention includes n number of serial to parallel converters 12, n two byte FIFOs 14, either one or n data valid signal generator(s) 18 and a multiplexer 19. As explained in more detail below, multiple copies (p number of copies) of the circuit 10 are provided. A single time wheel generator 16 is preferably provided for use by all of the circuits although, if desired, p time wheel generators which are synchronized may be used for p circuits. The serial to parallel converters 12 receive input data and clock signals from n input SONET/SDH signals. The time wheel generator 16, the data valid signal generator(s) 18 and the read side of the FIFO 14 receive a time wheel clock signal which is a higher frequency than the aggregate of the n SONET/SDH input clocks according to Equation 1.

$$TimeWheelClock > \frac{AggregateClock}{8} * (n+2) \qquad (1)$$

The incoming signals are typically higher rate SONET signals which include multiple lower rate signals. For example, an OC-3 SONET signal provides up to three STS-1 streams; an OC-12 provides up to twelve STS-1 streams, etc. The "+2" in the factor "n+2" provides the time wheel clock with two additional clock cycles during which no data is read. These clock cycles are used to read information from storage as described in more detail below. During these clock cycles, the data valid signal goes low to indicate that there is no data available on the multiplexed data bus 17. Exemplary time wheel clock frequencies are illustrated in Table 1 where the Aggregate Clock is shown as a single OC signal. It will be appreciated that the input is typically not a single OC signal but n different signals which may be the same rate or different rates.

TABLE 1

| Equivalent Input Signal | Time Wheel Frequency for a Five Stage Pipeline | Number of Channels and Spare Slots |
| --- | --- | --- |
| OC-3 | >32.40 MHz | 3 channels + 2 spare slots |
| OC-12 | >90.72 MHz | 12 channels + 2 spare slots |
| OC-24 | >181.44 MHz | 24 channels + 2 spare slots |

Figure 3:
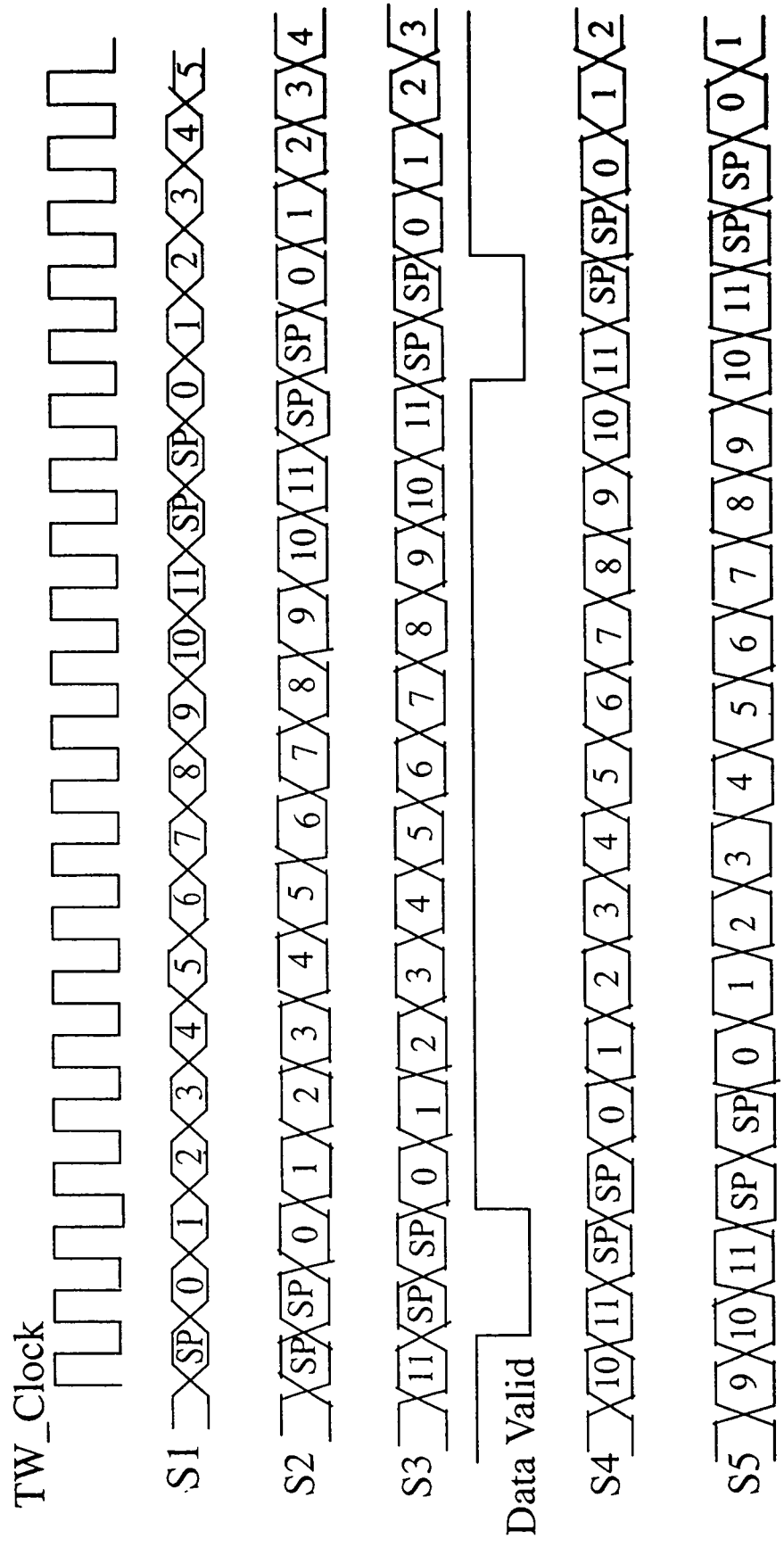
FIG. 3 is a timing diagram illustrating an exemplary time wheel clock for processing twelve STS-1 streams in five pipeline stages.

The outputs of the n converters 12 are n byte-wide streams which are delivered to the n two-byte FIFOs 14 and n clock/8 signals which are delivered to the data valid generators 18. The outputs of the FIFOs 14 are delivered to an n-to-1 multiplexer 19 which supplies a byte-wide multiplexed data bus 17. The output of the time wheel generator 16 includes clock signals S1-S5. The S1-S5 clock signals are illustrated in FIG. 3 with reference to a time wheel clock for an OC-12 signal having twelve STS-1 streams. Each of the clocks is one clock cycle behind the other. The clock cycles shown in FIG. 3 are labeled 0-11 for the twelve STS-1 streams from which multiplexed bytes are delivered to the multiplexed data bus. The clock cycles labeled SP are the two extra clock cycles during which no valid data is on the multiplexed data bus. The time wheel generator 16 supplies S1 and S2 clock signals to the data valid signal generator(s) 18 and the S1 clock signal to the FIFOs 14. Data is read from the FIFOs according to clock signal S1. The valid generator(s) 18 output(s) a data valid signal which is high during the clock cycles labeled 0-11 and low during the clock cycles labeled SP with reference to the S3 signal.

Figure 4:
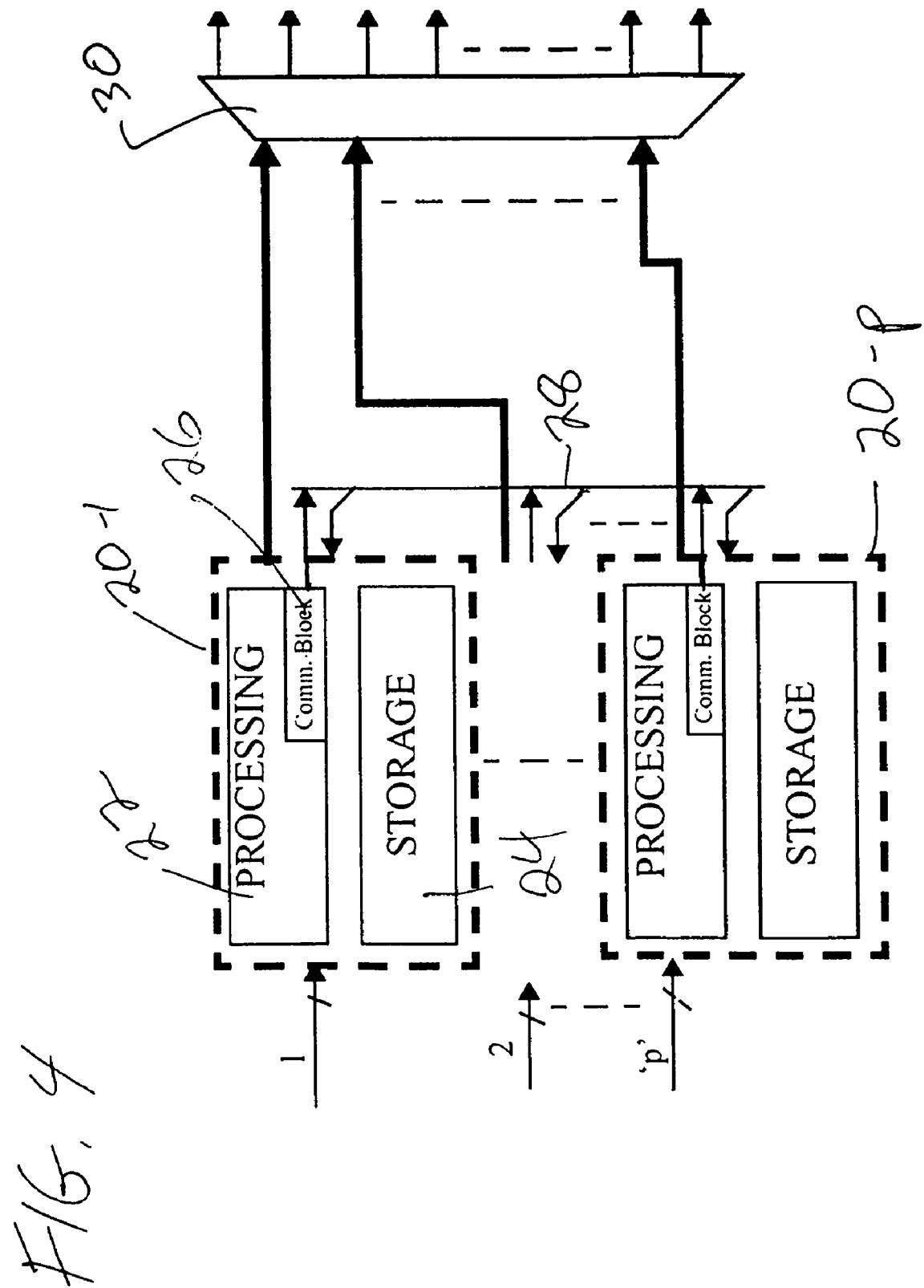
FIG. 4 is a high level block diagram illustrating "p" number of pipelines and a demultiplexing circuit for extracting individual STS streams onto a bus.

FIG. 4 illustrates a very high level view of p copies of processing circuitry 20-1 . . . 20-p according to the invention. Each processing circuit 20 includes processing logic 22, associated storage 24 (state RAM), and a communications block 26. The communications blocks 26 are coupled to a communications bus 28 so that each circuit 20 can share information when necessary as described in more detail below. Each of the circuits 20-1 . . . 20-p receives multiplexed data and clock signals from one of the circuits 10 (FIG. 2). To put FIG. 4 in context, an exemplary implementation of shared processing for an OC-48 signal and a time wheel set for an OC-12 signal (see Table 1, 90.72 MHz) involves four circuits 20 (p=4), each receiving a data stream from one of four circuits 10. The data from each circuit 10 illustratively may be four STS-3 streams, one STS-12 stream, one fourth of an STS-48 stream, or twelve multiplexed STS-1 streams. An OC-192 implementation involves an OC-24 time wheel and eight circuits 20, each receiving a data stream from one of eight circuits 10. It will be appreciated that the same OC-192 signal could be processed with an OC-12 time wheel and sixteen circuits (p=16). The outputs of the circuits 20-1 . . . 20-p are demultiplexed by circuit 30 to produce up to n*p individual STS streams which may be cross-connected, supplied to a demapper, or otherwise processed. If the original signal was an OC-48 the forty-eight streams are out back together (multiplexed). If the original signal(s) included n or more STS-1 streams, the multiplexed streams are demultiplexed into individual streams.

Since the circuits of the invention can process multiple different rate STS-N SONET signals, the communication block 26 provides a means to transfer relevant line information from the master (the first time slot in the STS-N) to the slave slots. Also it is important to note here that the time-wheel has a fixed number of slots. In the exemplary embodiment, there are twelve data slots and two spare slots. So if an STS-N signal is input where the value of N is less than or equal to twelve, then a single circuit 20 is able to handle the processing, and input and output for each slot is read-written to state RAM using the time-wheel. If N is greater than twelve, then communication is mandatory across circuits from the circuit processing the master to circuits processing the slaves (which are not processed by the circuit processing the master). In this situation, the communication block transfers information from master to slave using a bus 28 (referred to herein as the Inter-STS Communications bus (ISCB)) for a given line which spans more than one circuit 20. The relevant processing blocks (and signals for communication) include: Framing, Scrambling, B1, B2, Retiming and Pointer Justification.

An STS-N signal, carried over a single SONET line (OC-N line), can contain multiple paths (channels). In the exemplary embodiment, N is a maximum of twelve which corresponds to the number of data valid time slots in the time wheel. Each path can be represented as STS-M where M is a factor of N. In the case of M=1 no information needs to be transferred across time slots as each processing of an STS-1 is self-contained within a time-wheel slot. But if M>1 then path information needs to be transferred across time-wheel slots from the master slot to slave slots. The path information is based on the network configuration and is provided in the routing table.

For both line and path, if the value of N in STS-N or the value of M in STS-M is larger than twelve, then a single processing block 20 is unable to process all the slots since the time-wheel in this example can handle a maximum of twelve slots. The use of p processing blocks 20 and state RAMs 24 as shown in FIG. 4, allows the processing of STS-N or STS-M with N or M=p*12. But there is only one master slot for a given STS-N or STS-M signal and it occurs in only one of the slots of one of the processing blocks. The line and path information (framing bytes, pointer justification, etc.) needs to be transferred to the remainder of the (up to forty-seven) slots which means sending it across to other processing blocks 20. This is handled by the communication blocks 26 and the bus 28. According to the presently preferred embodiment, all of the circuits 20-1 through 20-p as well as the circuits of FIG. 2 are embodied in a single integrated circuit chip.

Figure 13:
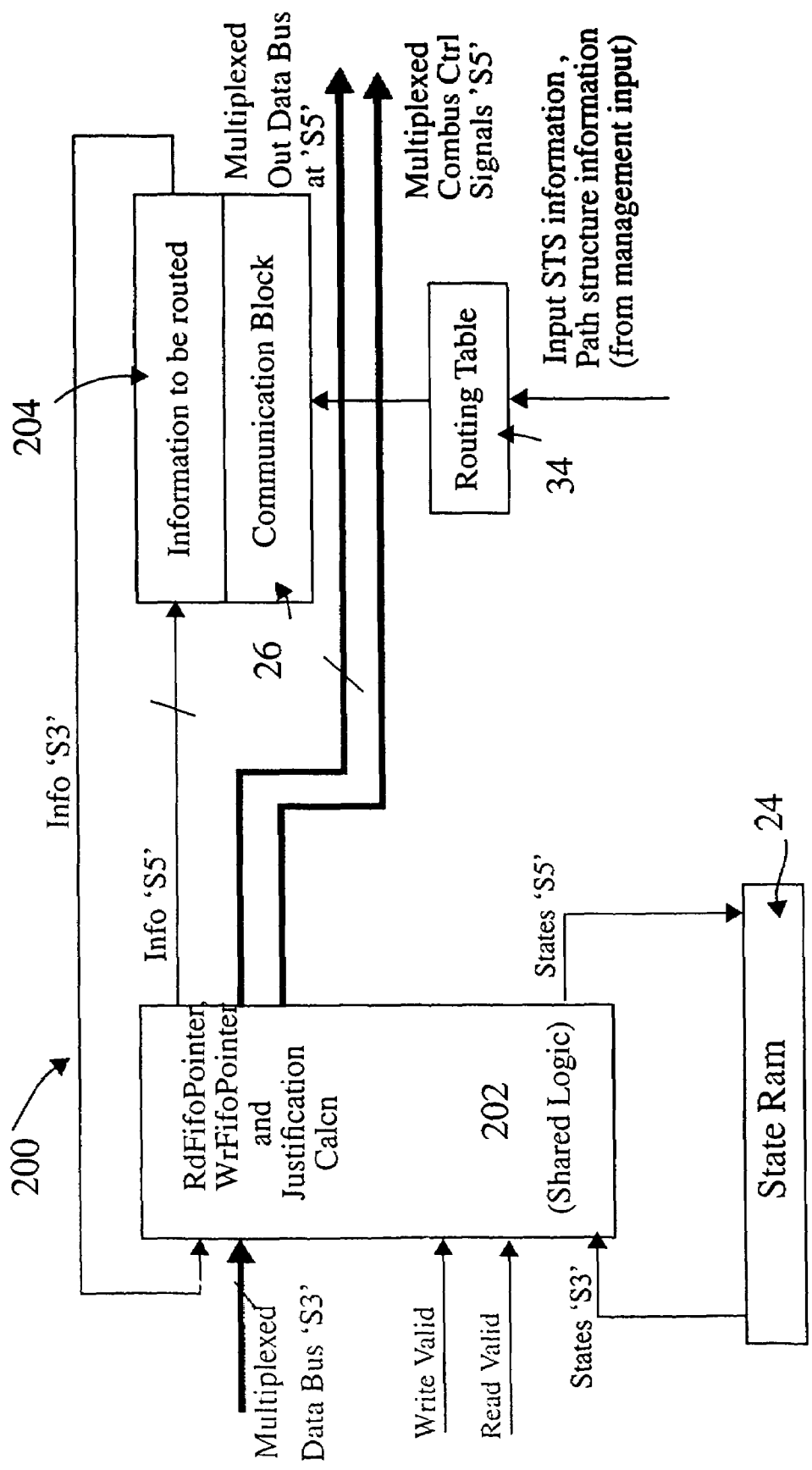
FIG. 13 is a high level block diagram illustrating shared retiming and pointer generation circuits.

The remainder of the Figures show more details of the exemplary processing circuit 20 as individual stages in a pipeline. These stages will be described in the order in which they occur when receiving signals, i.e. framing (FIG. 5), descrambling (FIG. 6), line TOH/MSOH processing (FIGS. 7 and 8), and pointer tracking and retiming (FIG. 13). In transmitting signals, the process is substantially reversed, i.e. pointer generation, line TOH/MSOH processing, and scrambling.

Figure 5:
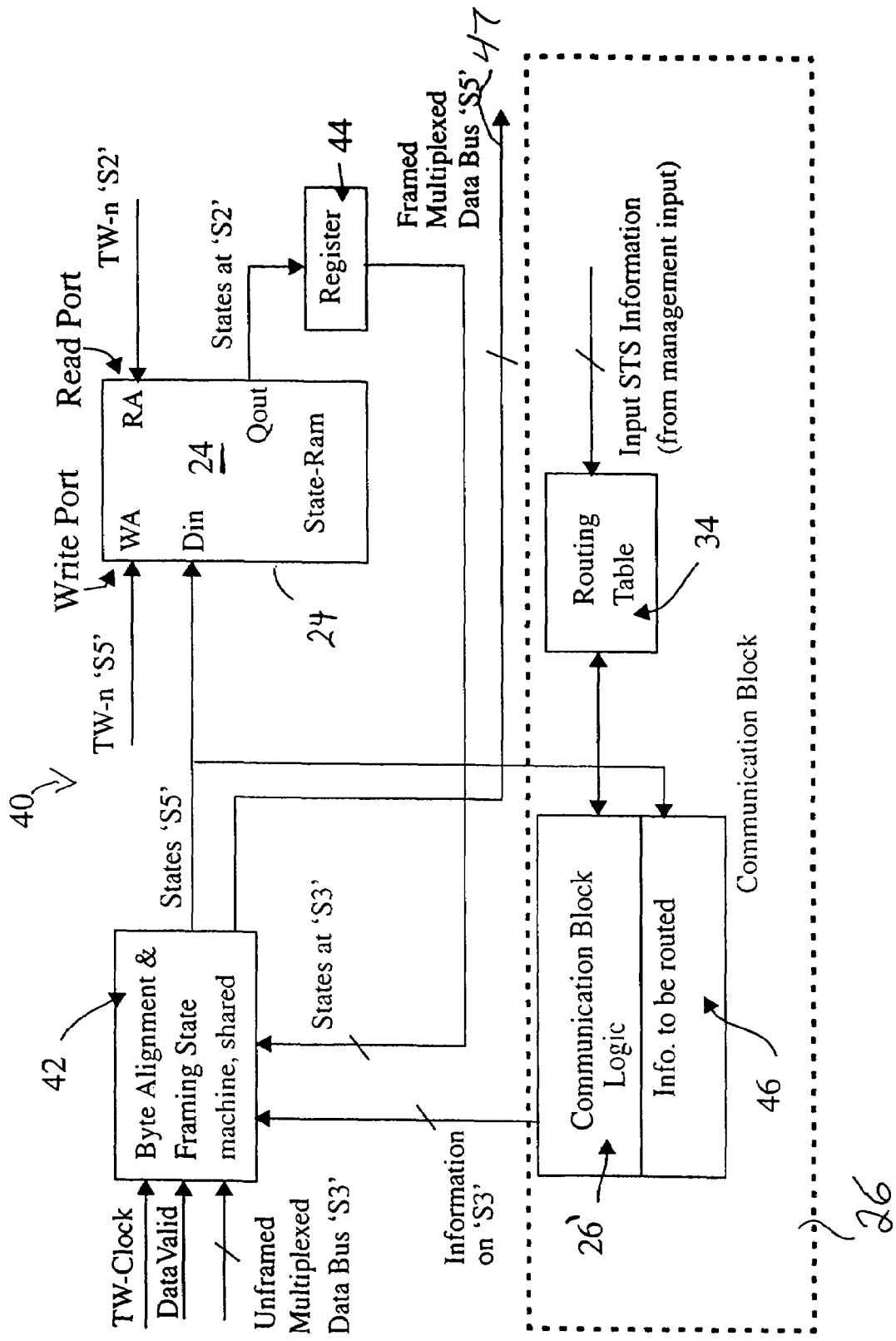
FIG. 5 is a high level block diagram illustrating the shared byte alignment and framing circuit in the pipeline.

Turning now to FIG. 5, circuit 40 (which is the first part of the processing block 20 shown in FIG. 4) for performing byte alignment and framing includes a state machine 42, a state register 44, and a buffer 46 for framing information to be shared (routed). The state machine 42 receives input from the circuit 10 (FIG. 2), from the register 44, and from the communications block 26 and provides output to the state RAM 24, the buffer 46, as well as to a framed multiplexed data bus 47. The communications block 26 is shown here to include communications block logic 26', buffer 46 and routing table 34. The logic 26' receives input from the buffer 46 and is bidirectionally coupled to the routing table 34 which receives routing information from management input. Those skilled in the art will appreciate that the management input is typically received from a workstation (not shown) which is attached to the SONET switch within which the processing of the invention takes place. The register 44 receives state information from the state RAM 24 at clock cycle S2 and provides the information to the state machine 42 at clock cycle S3. Information from the communications block 26 and unframed multiplexed data from the bus 17 of circuit 10 are also provided to the state machine 42 on clock cycle S3. The outputs from the state machine are provided on clock cycle S5.

Use of the communications block 26 shown in FIG. 5 is only necessary if the multiple STS streams on the unframed multiplexed data bus 17 are not STS-1 streams. In the case of an STS-M signal where M>1, there are M byte interleaved signals. Thus, there are M repetitions of framing bytes. In order to frame the signals using shared circuitry, it is necessary to determine which is the first of the M sets of framing bytes. The communication block logic 26' and the buffer 46 serve this function.

Each of the N STS-1 streams in an STS-N signal (N>1) are checked for frame boundaries separately in circuit 42 and state RAM 24. Once a frame boundary is found, the information of frame-match is forwarded to the buffer 46. The time slot address in which the frame-match information is generated is referred to as the master slot. Using the routing table 34, the frame match is then routed by communications block 26 to all time slots of all of the circuits 20 (FIG. 4) processing that input SONET STS-N signal. The routing table 34 for this purpose contains information as to how the input SONET/SDH signals have been multiplexed on the p multiplexed data buses generated by circuit 10 (FIG. 2). All other time slot addresses apart from the master onto which the STS-N signal has been multiplexed are referred to as slaves. The framing state machine for the master time slot also generates out-of-frame and loss-of-frame information as required by the standards. This information is also stored in the buffer 46 and then routed to the slave slots using the information stored in the routing table 34.

Figure 6:
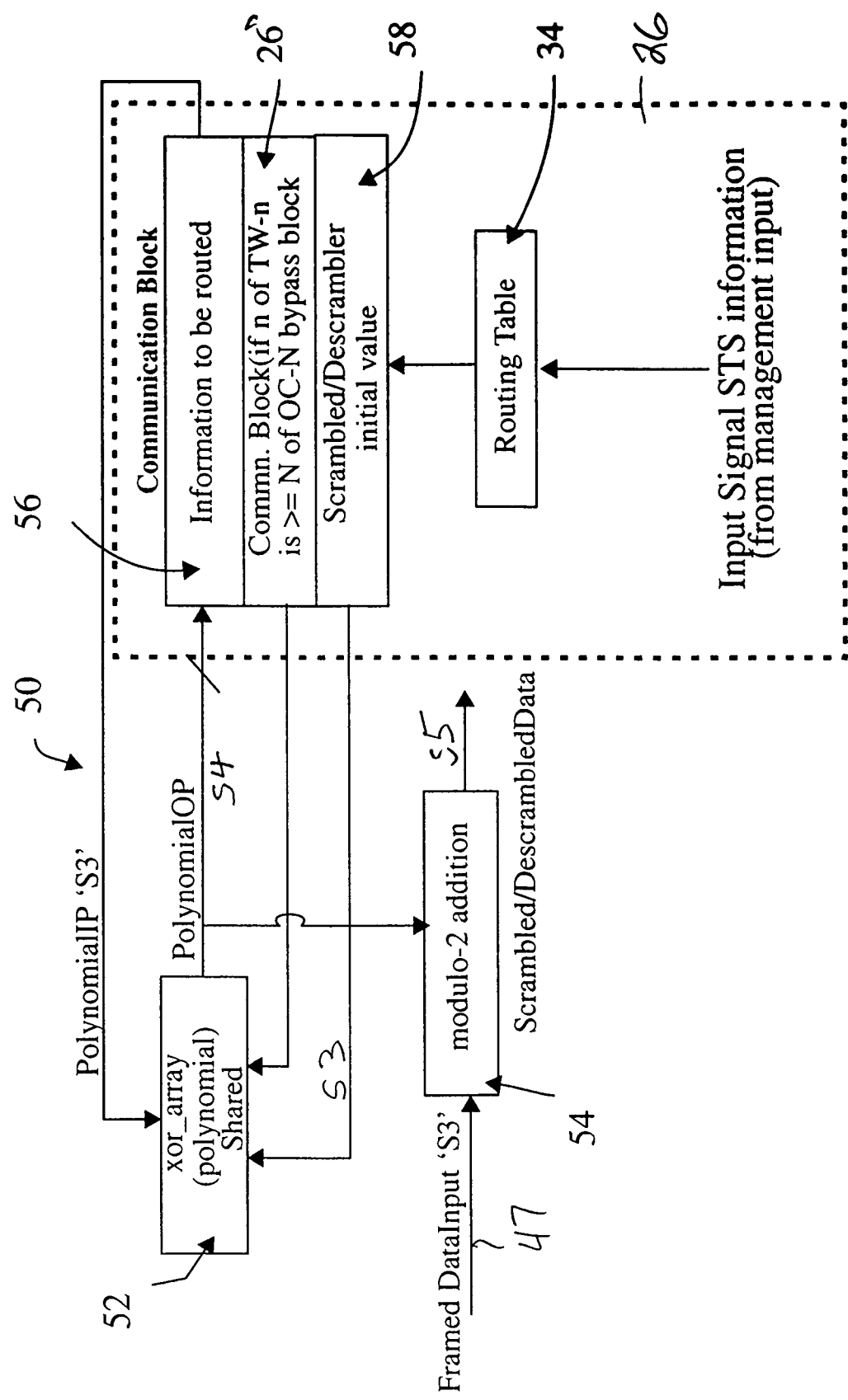
FIG. 6 is a high level block diagram illustrating the shared descrambling circuit in the pipeline.

After the data is framed, it is descrambled by the shared descrambling circuitry 50 shown in FIG. 6. The descrambling circuitry includes an XOR polynomial array 52, a modulo-2 adder 54, a shared information buffer 56, and an initial value buffer 58. Descrambling is achieved by performing a modulo-2 addition of a polynomial stored in array 52 with the framed data received from the output 47 of the state machine 42 (FIG. 5). The same process is used for scrambling. The polynomial initial value (typically "11111110") is obtained from the routing table 34 and is stored in the buffer 58 where it is supplied to the array 52 at clock cycle S3. The array 52 also receives the previous state of the polynomial from the buffer 56 at clock S3 and outputs the current polynomial at clock S4 to the adder 54 and the buffer 56. The adder 54 outputs scrambled/descrambled data at clock S5.

As previously mentioned, the communications block 26 is only necessary when the signals being descrambled are STS-N>1 signals containing byte interleaved signals which must be descrambled individually. For a SONET/SDH input of the type STS-N (where N>1) the bytes are processed across multiple time slot addresses of the time wheel. Thus, for each of the slave slots the initial polynomial value would not be 11111110. For example, the second slot initial value needs to be generated from the polynomial $1+x+x^7$ using the first slot's initial value of "11111110". Therefore, depending on the value of N and the multiplexing on to the time wheel, each of the time slot addresses needs a different initial polynomial value. The initial values are stored in the buffer 58 and the correct value provided based on the routing table 34. For independent STS-1 input signals the initial value and the current value of the polynomial are not dependent on the processing of STS streams in other time slot addresses and are bypassed by communication block 26'.

Figure 7:
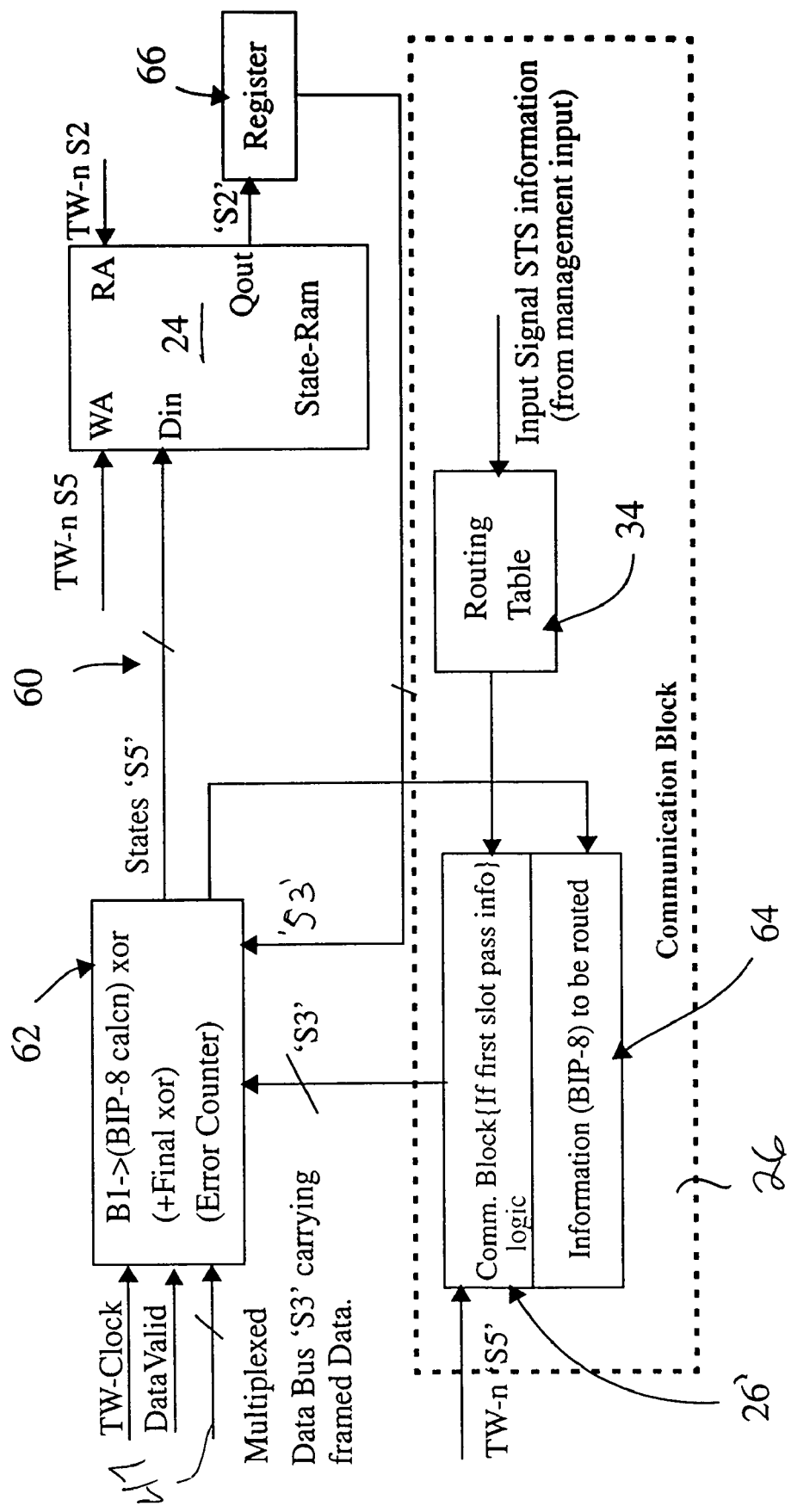
FIGS. 7 and 8 are high level block diagrams illustrating shared B1 and B2 processing circuits in the pipeline.

Concurrent with descrambling, BIP-8 calculation is performed using the B1 byte as illustrated in FIG. 7 and after BIP-8 processing error counting is performed in the next clock cycle. The B1 processing circuit 60 includes a BIP-8 calculator and error counter 62, a shared information buffer 64, and a register 66. The register 66 receives B1 processing states from the state RAM 24 on clock S2 and sends the state information to the error counter 62 on clock S3 at the same time as routing table information is transferred from the communications block logic 26' to the error counter 62. Also at S3, the framed multiplexed data is provided to the error counter 62 by the byte alignment and state machine 42 (FIG. 5). B1 processing state information is output from the error counter 62 to the state RAM 24 at clock S5, and the result of the calculation by the counter 62 is provided to the buffer 64.

The B2 processing circuit 70 (FIG. 8) follows the B1 processing in the pipeline and includes a BIP-8 calculator and error counter 72, a shared information buffer 74, and a register 76. The register 76 receives B2 processing states from the state RAM 24 on clock S2 and sends the state information to the error counter 72 on clock S3 at the same time as routing table information is transferred from the communications block to the error counter 72. Also at S3, framed and descrambled multiplexed data is provided to the error counter 72 from the adder (54 in FIG. 6). B2 processing state information is output from the error counter 72 to the state RAM 24 at clock S5.

Figure 8:
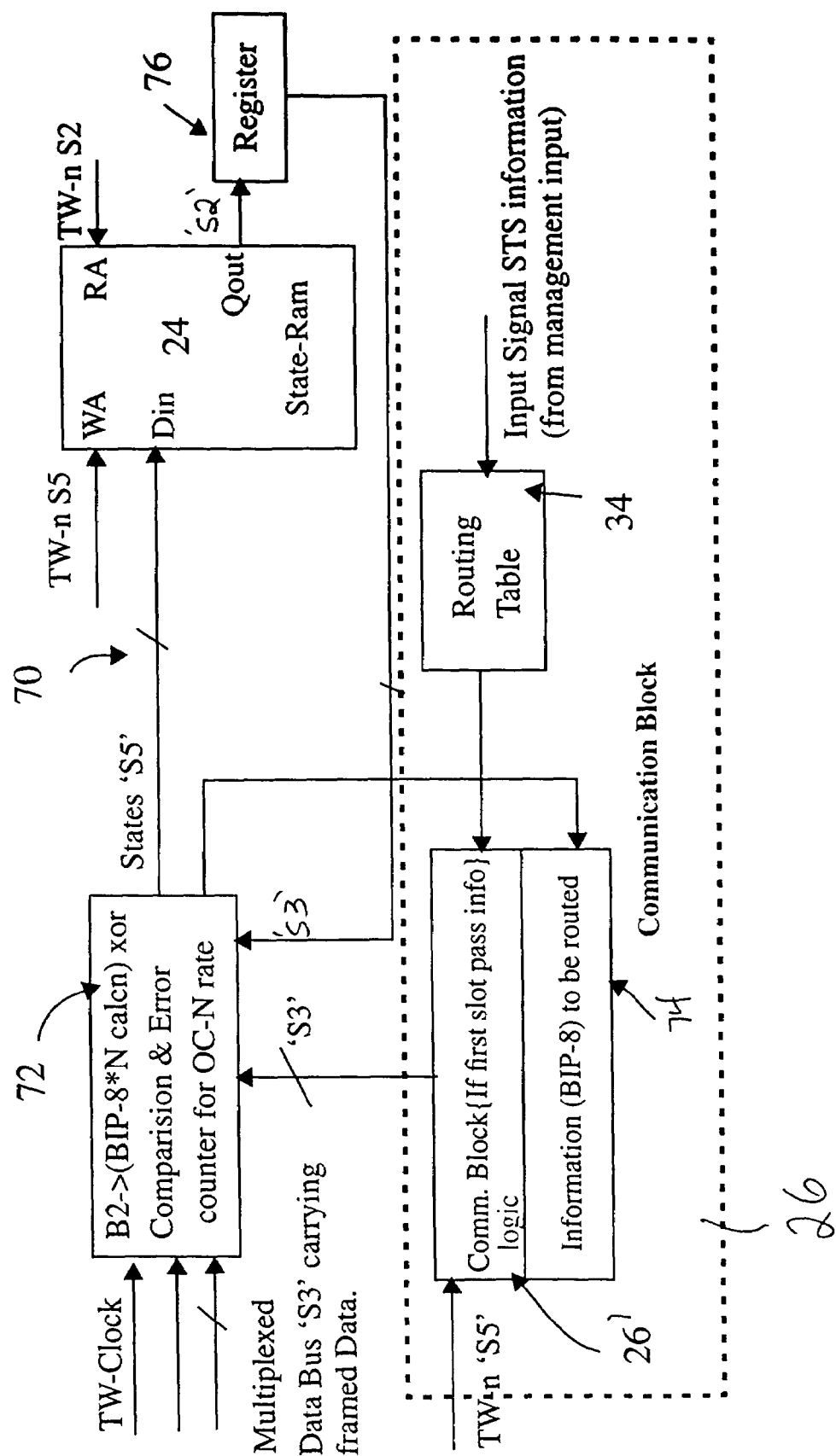

For B1 and B2 processing, instead of passing the information from master to slave based upon the current state, it is passed from the slaves to the master. For B1 and B2 processing, the BIP-8 is calculated per time slot for any input signal. At the end of the STM-N/OC-N frame each calculated BIP-8 is stored in the buffer 64. Then the routing table 34 is used to pass this information to the first slot of the STM-N/OC-N input signal. As seen in FIG. 8, the BIP-8 for STM-N/OC-N is used for comparison with the incoming B2 which is available on the first slot processing opportunity. Unlike B1 processing, for B2 processing on the receive side, the calculated BIP-8 for the $m^{th}$ slot is compared with the extracted B2-m byte ($1 \leq m \leq N$). The error is then stored in buffer 74. Then the routing table 34 is used to find the total errors received per frame.

For B1 and B2 processing, information from multiple sources needs to be routed to a single block, i.e. the block processing the first (master) slot. Handshaking between the shared logic (processing blocks 22 in FIG. 4) and the communication block 26 is used to request and acknowledge receipt of the information. The communication block knows from the routing table 34 how many sources need to route information. Hence, the communication block keeps sending information whenever information is requested by shared logic (processing block). For each request, the communication block sends the information (ISCB_SlaveData) from buffers 64 and 74 together with an indication (ISCB_SlaveDataValid) which shows whether data is valid or not. When information for the last slot has been transferred the communication block sends an indication (ISCB_AckRecieved), typically from master to slaves but in this case from slaves to master, that all channel information has been transferred.

Figure 9:
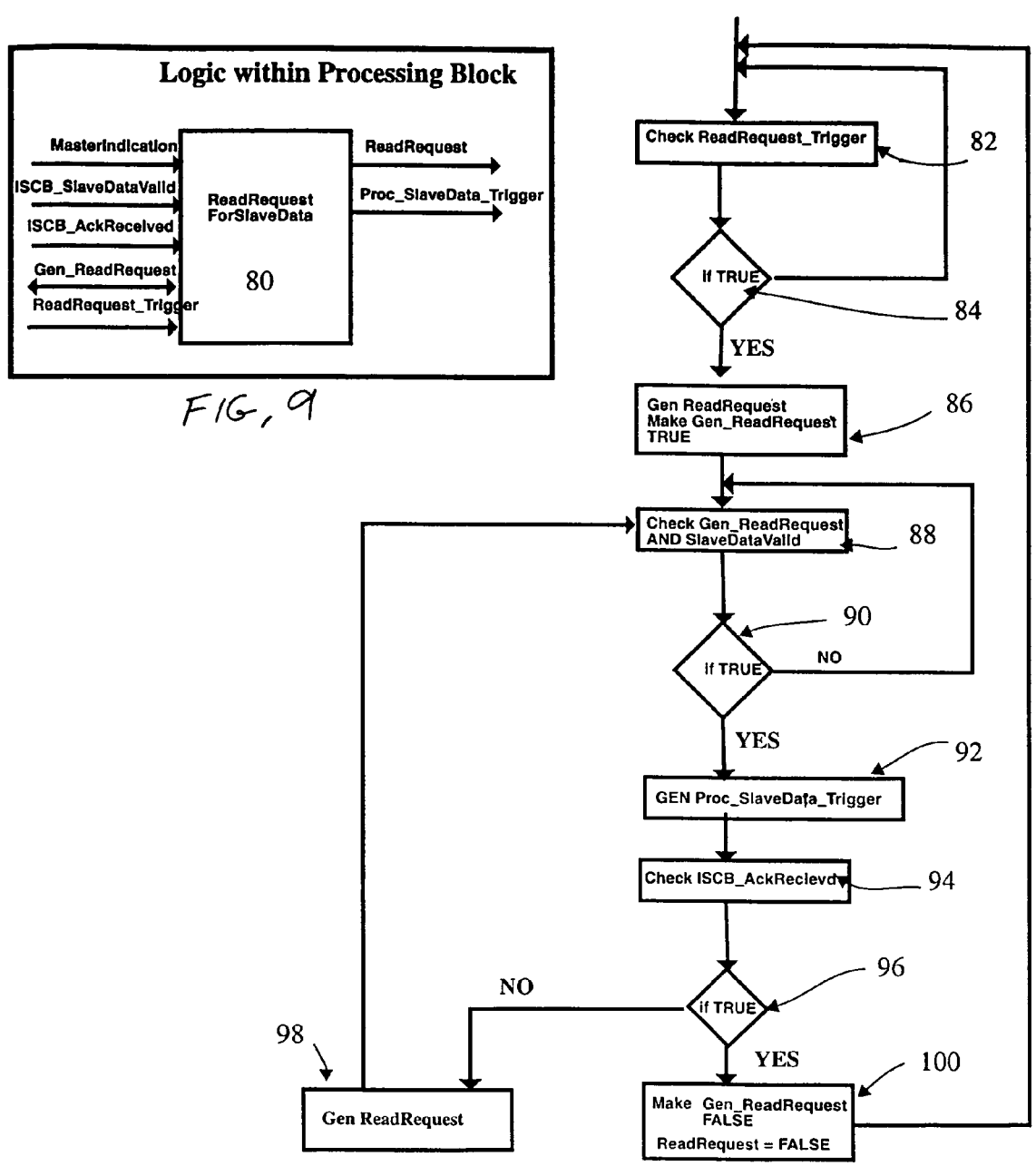
FIG. 9 is a simplified block diagram illustrating communication among processing of different STS-1 streams which are part of the same input SONET signal.

The handshaking circuit for communication among communication blocks 26 is shown in FIG. 9 and the logic of the handshaking circuit is illustrated in FIG. 9A. The timing of the handshaking signals is illustrated in timing diagrams FIGS. 10-12. Referring now to FIG. 9, the circuit 80 receives the signals "MasterIndication" (typically provided by the routing table 34), "ISCB_SlaveDataValid", "ISCB_AckReceived", "Gen_ReadRequest", and "ReadRequest_Trigger" (typically generated by the master slot after conducting its own B1 and B2 calculations) via the communications bus 28 (FIG. 4). (The abbreviation ISCB stands for Inter-STS Communications Bus, i.e. the bus 28 in FIG. 4.) The circuit 80 generates the signals "ReadRequest", "Proc_SlaveData_Trigger", and "Gen_ReadRequest".

The operation of the circuit 80 is described in the flowchart of FIG. 9A. Starting at 82, the ReadRequest_Trigger signal is polled repeatedly until it is determined at 84 that the signal is asserted. In response to the ReadRequest_Trigger, the circuit 80 asserts the ReadRequest signal per channel and the Gen_ReadRequest signal (over all channels) at 86. At 88 the circuit waits for the SlaveDataValid signal to be asserted. When SlaveDataValid is asserted as determined at 90, the signal Proc_SlaveData_Trigger is asserted at 92 and the ISCB_AckReceived signal is polled at 94. If the ISCB_AckReceived signal is not asserted as determined at 96, the ReadRequest signal is asserted at 98 and the operation returns to 88. If the ISCB_AckReceived signal is asserted as determined at 96, the Gen_ReadRequest signal and the ReadRequest signal are both de-asserted at 100 and the circuit returns to polling the ReadRequest_Trigger signal at 82.

Figure 10:
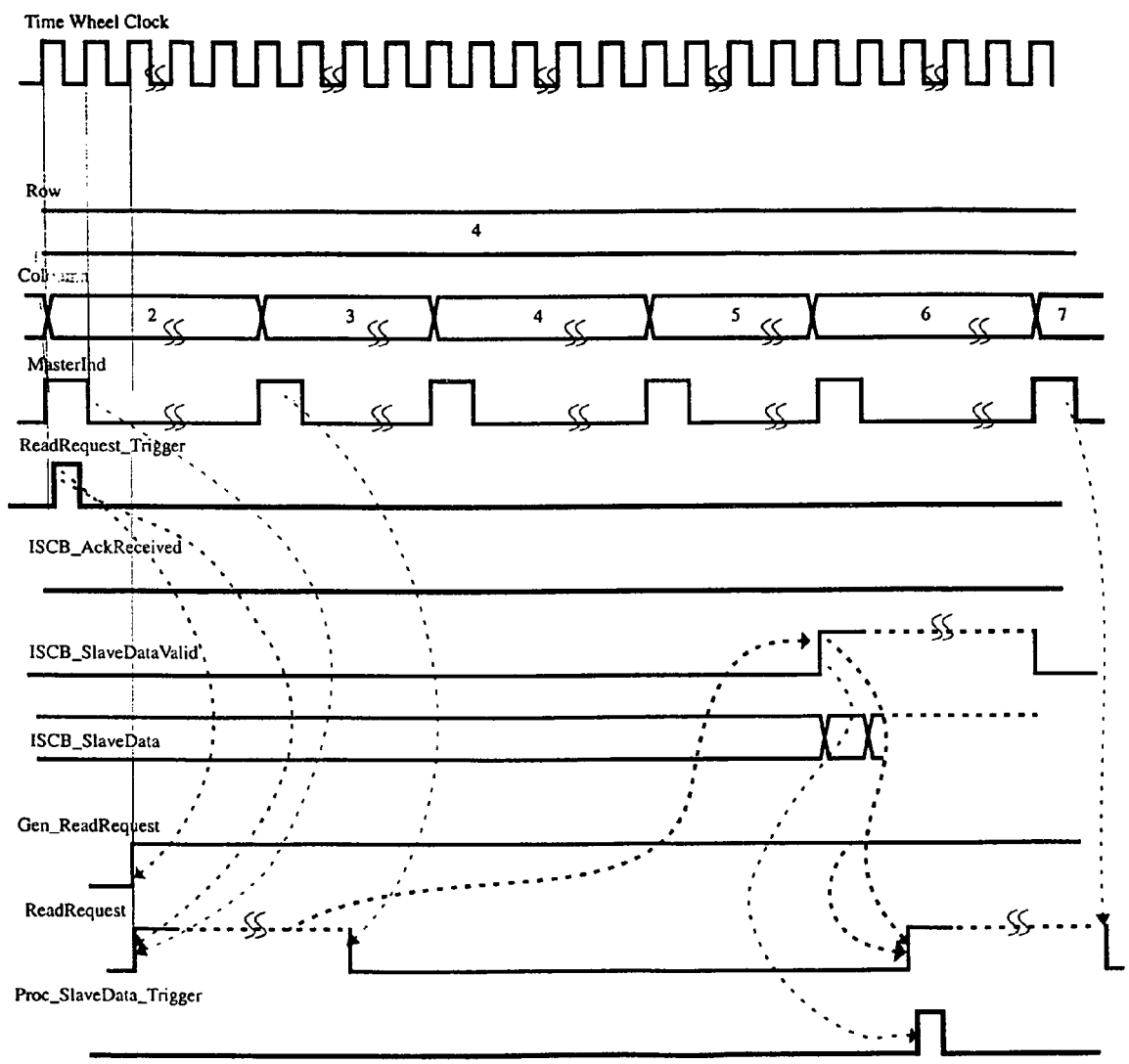
FIGS. 10 through 12 are timing diagrams illustrating the handshaking and transfer of information between the processing block and the communication block.
Figure 11:
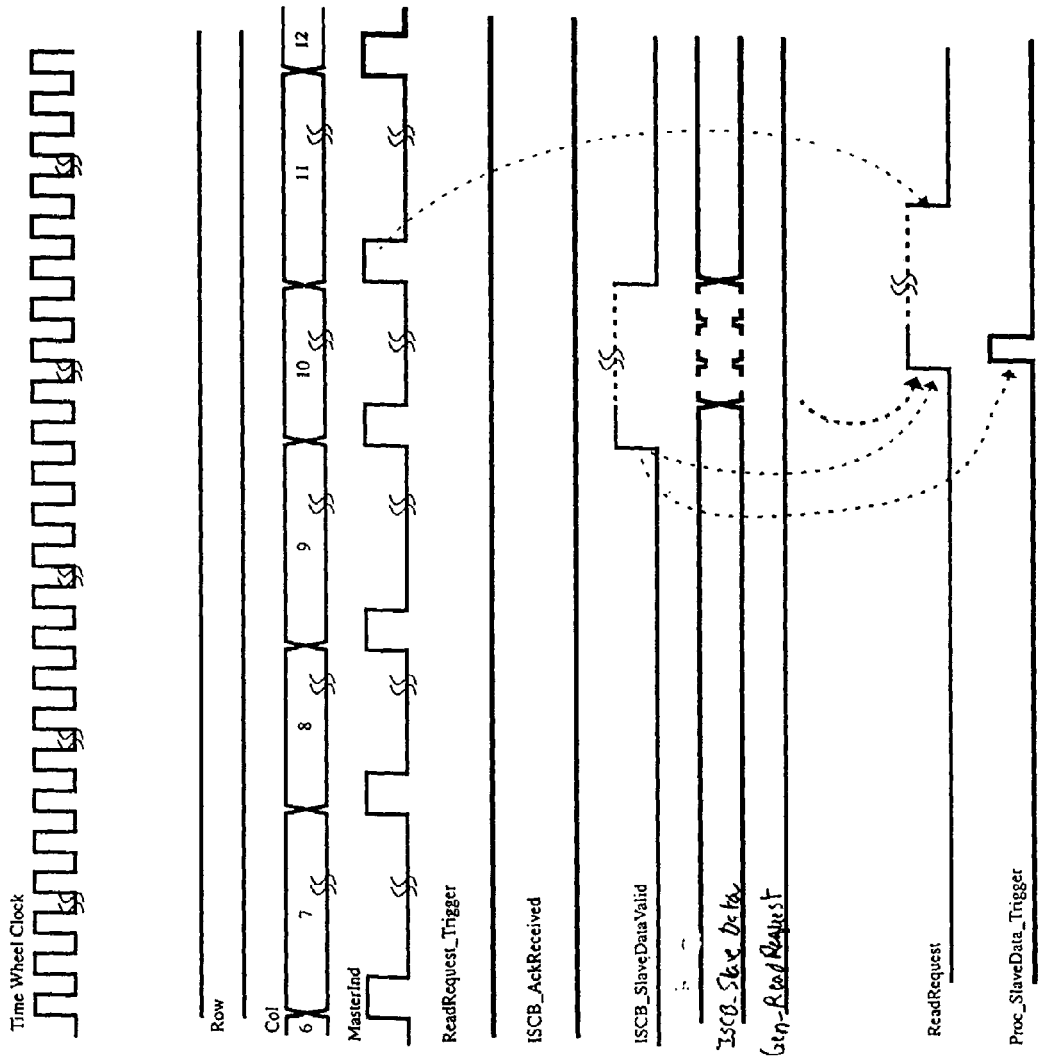
Figure 12:
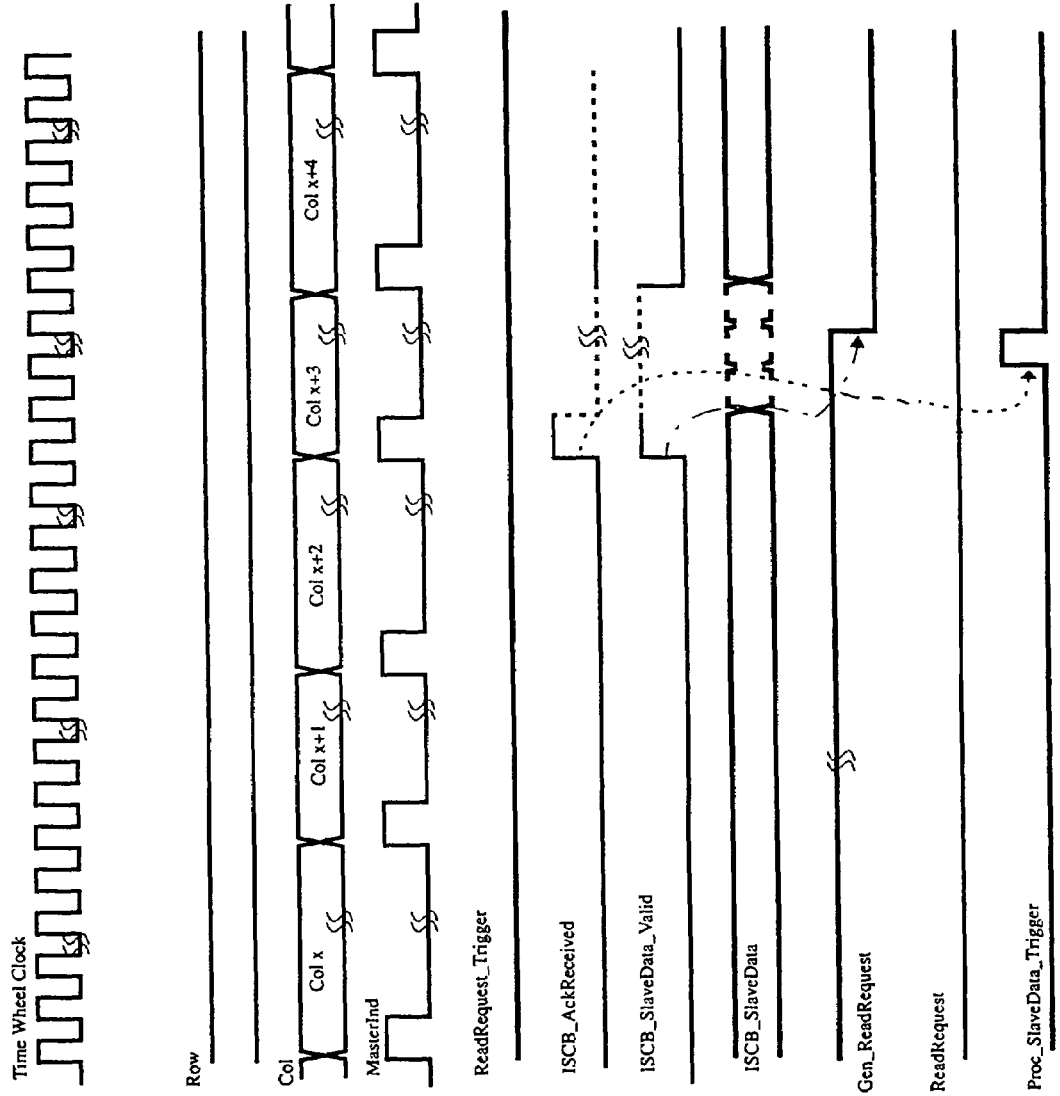

The timing of the signals described above is illustrated in FIGS. 10-12. FIG. 10 shows the signals at the start of a read operation. FIG. 11 shows the signals during an intermediate state of transfer and FIG. 12 shows the conclusion of the transfer. The signals from top to bottom are: the time wheel clock, row clock, column clock, MasterIndication signal, ReadRequest_Trigger signal, ISCB_AckReceived signal, ISCB_SlaveDataValid signal, ISCB_SlaveData, Gen_ReadRequest signal, ReadRequest signal, and Proc_SlaveData_Trigger. The timing of the signals, for the transfer of information from shared buffer 64 (FIG. 7) by communications block 26 to processing block 72 (FIG. 8) for B2 byte processing described above is illustrated in FIG. 10-12. All inputs MasterIndication, ISCB_SlaveData_Valid and ISCB_AckReceived are provided by communications block 26 with respect to time slot address S3. The outputs and state variables ReadRequest, Gen_ReadRequest and Proc_SlaveData_Trigger are all output with respect to time slot address S5.

FIG. 10 shows the signals at start of the transfer of information and the transfer of first resultant error (ISCB_SlaveData). FIG. 11 illustrates the signals at an intermediate state of information transfer and FIG. 12 shows the conclusion of the transfer. The MasterIndication signal is high at first time slot address of the input SONET signal which is carried on the Framed Multiplexed Data bus. It repeats for every byte of the STS-1 stream on the first time slot address and is shown as such in the timing diagrams. (Note that the diagrams only show a few of the twelve time slots between MasterIndication pulses. The double lines indicate a break in the timing diagram.) ReadRequest_Trigger is generated for the master time slot at Row counter value of 4 and Column counter value of 2 of the input SONET signal frame. In FIGS. 10-12, SONET rows and columns are counted from zero. Thus, the ReadRequest_Trigger is generated at two columns immediately following the B2 byte (column zero) after the B2 BIP-8 calculation is completed (column 1). It will be appreciated that B1 is therefore processed in row 1 columns 0-2 and pointer movements are processed at row 3 columns 2 and 3. The output ReadRequest and state variable Gen_ReadRequest go high because of ReadRequest_Trigger being high along with MasterIndication. These are output with respect to clock signal S5 and are hence clock delayed as shown in the timing diagrams. The Gen_ReadRequest as stated in the description of FIG. 9A remains high until all data is transferred which is indicated by ISCB_AckReceived being set high by communications block 26. This is shown in FIG. 12. The ReadRequest output signal goes low at the next MasterIndication input being high. When ReadRequest is asserted by the processing block 72, the communications block 26 samples it high and after processing the request makes the shared information available on the ISCB_Slave-Data signal. This takes three clock cycles. The availability of the information on the ISCB_SlaveData is indicated to processing block 72 by assertion of ISCB_SlaveData_Valid. This is shown in FIG. 10-12. If ISCB_AckReceived is not asserted, then when ISCB_SlaveData_Valid is sampled high, ReadRequest is asserted when MasterIndication is high with respect to clock signal S5. Proc_SlaveData_Trigger is also asserted when ISCB_SlaveData_Valid is sampled high at MasterIndication high position. The sampling of ISC_AckReceived in FIG. 12 results in termination of the transfer from shared buffer 64 to processing block 72 by the communications block 26.

Turning now to FIG. 13, shared retimer circuits 200 for processing pointers include shared logic 202 for read pointer, write pointer, and justification calculations and a buffer 204 for information to be shared. The shared logic 202 is coupled to the state RAM 24 and the buffer 204. The buffer 204 is coupled to the communications block 26 which receives input from the routing table 34. Moreover, the shared logic 202 receives multiplexed data from the data bus from adder 54 in FIG. 6 and a Write Valid signal (previously referred to as Data Valid) which is generated by the valid generator(s) (18 in FIG. 2). In addition, the logic 202 receives a Read Valid signal which is generated from the Combus Clock as described below with reference to FIG. 14. The logic 202 outputs multiplexed data and multiplexed Combus control signals.

The shared logic 202 treats each time slot as an individual slot and processes it accordingly. If the multiplexed signals are STS-N>1 signals then information needs to be transferred across the time slots. Similarly, in the case of modularity (STS-N>12), information needs to be transferred in space (e.g. across the bus 28 in FIG. 4) The communication block 26 is used to transfer this information.

The communication block 26 performs the following at the path level for the retimer: communication across the different time slots for a given line; communication across the different time slots which are concatenated for a given line; and communication in space in the case of modularity.

The Retimer 200 performs the SONET line level retiming function. It adapts the SONET Higher Order Path from one clock domain to another when the clocks are not synchronized or adapts the incoming data to another SONET frame having different boundaries. The Retimer uses the standard pointer generation finite state machine (PGFSM) along with a standard leak rate algorithm. In a conventional retimer there are different read and write clocks. There, data from one clock domain is adapted to another with justifications, if required. In the Retimer 200, the read and write clocks are based on the Time Wheel clock. The difference in read and write clocks is reflected through the different DataValid signals for the read and write side.

The Retimer 200 works on a per path basis sharing the logic 202. For path level processing, the requirement for communicating with other time slots arises due to the reasons outlined above. The shared logic 202 includes a FIFO and a PGFSM. It calculates the RdPointer and WrPointer for the FIFO and generates the data for the pipeline output. In the case of concatenated path configuration it is required that all concatenated slots after the first (path slaves) shall follow the first slot (master). This means that the Rdpointers, Wrpointers, SPE of Combus and data continuity must be the same. This communication for bringing all the slaves in synch with the master is achieved through the communication block 26 which routes the information using the Routing Table 34.

The State Ram 24, Communication Block 26 and Routing Table 34 are partitioned into two logical areas, one processed during the Write Valid assertion time and the other during the Read Valid assertion time. This achieves the same results as a non-multiplexed standard retimer which uses two different clocks.

Figure 14:
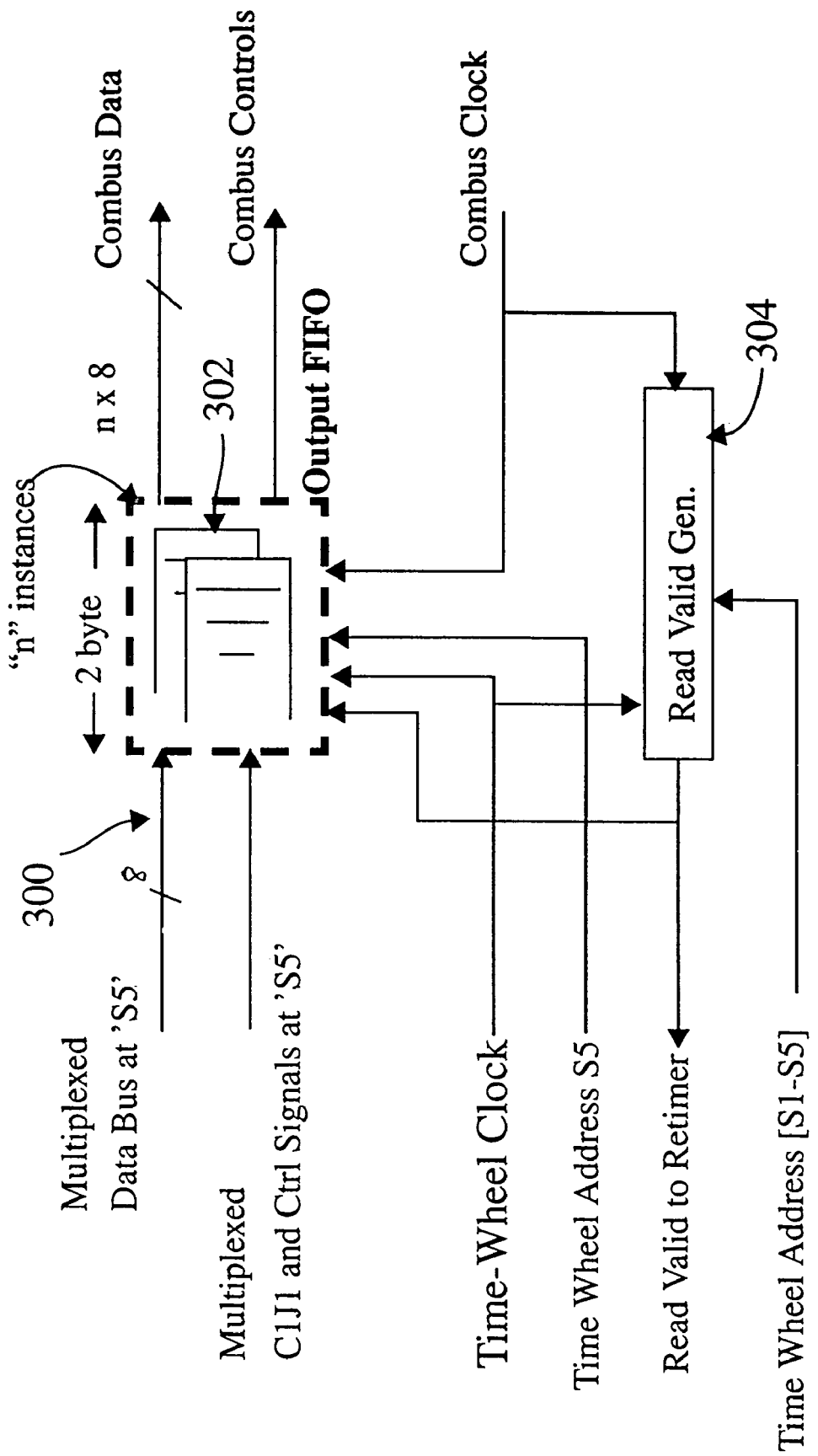
FIG. 14 is a high level block diagram illustrating output bus data demultiplexing.

Turning now to FIG. 14, the output Combus Demultiplexing Block 300 includes n instances of a two-byte FIFO 302, where n is the same as the number of instances of the input FIFO 14 (FIG. 2), and a Read Valid Generator 304. The Demultiplexing block 300 takes multiplexed data and control signals (C1J1 signal, the C1(J0), and the J1 bytes in the composite data signal, SPE active high signal which marks the payload in the STS frame, Fail signal which indicates location in the STS frame where an error during transmission/processing has occurred, and optionally a Parity signal) as input to the FIFO 302. The data is only written when the Read Data Valid is asserted. The data stored in the FIFO 302 is read out using the Combus clock which is also then used as system clock else-where. The Read Valid signal is also used in the Retimer (FIG. 13) for Read side processing. The ReadValid signal is generated from the Combus Clock and Time Wheel signals (S1-S5). It thus realigns data from Time Wheel clock domain to Combus clock domain.

There have been described and illustrated herein methods and apparatus for time multiplexed SONET line processing. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. A method for processing n number of SONET STS streams, where n is an integer greater than two, comprising:
   deserializing each of the n number of streams;
   buffering each deserialized stream;
   generating a time wheel clock having a frequency greater than the aggregate deserialized data rate;
   generating a plurality of clock signals synchronous to the time wheel clock, the plurality of signals each representing a plurality of time slots that include time slots corresponding to the n number of streams as well as a number of spare time slots;
   utilizing at least one of the clock signals to multiplex the n streams over a parallel databus during the time slots corresponding to the n streams and generate a control signal that no valid data is present on the parallel databus during the spare time slots; and
   processing the multiplexed n streams in a pipeline, wherein the pipeline includes a plurality of shared circuits operating at the time wheel clock frequency.

2. The method according to claim 1, wherein:
   said processing includes at least two processes selected from the group consisting of framing, descrambling, and pointer tracking.

3. The method according to claim 1, wherein:
   (n times p) streams are processed, p being an integer, and said streams are processed using p pipelines with n streams being processed in each of the pipelines.

4. The method according to claim 1, further comprising:
providing a communication circuit and communicating information among said plurality of circuits.

5. The method according to claim 3, further comprising:
providing a communication circuit in each pipeline and a communication bus coupling the communication circuits, and communicating information among said p pipelines.

6. The method according to claim 1, wherein:
said n number of STS streams are contained in a single SONET STS-n signal.

7. The method according to claim 1, wherein:
said n number of STS streams are contained in multiple SONET STS-M signals, where M is a factor of n.

8. The method according to claim 3, wherein:
said (n times p) streams are contained in a single SONET STS-(n times p) signal.

9. The method according to claim 3, wherein:
said (n times p) streams are contained in multiple SONET STS-M signals, where M is a factor of (n times p).

10. The method according to claim 5, wherein:
the information is BIP-8 information.

11. The method according to claim 5, wherein:
the information is pointer information.

12. An apparatus for processing n number of SONET STS streams, where n is an integer greater than two, comprising:
a multi-stream processing apparatus which includes
n number of serial to parallel converters having outputs outputting n number of byte wide data streams, said data streams having an aggregate data rate;
n number of buffers, each coupled to a respective output of a serial to parallel converter, said buffers having outputs outputting n number of buffered data streams;
a multiplexer coupled to said outputs of said n number of buffers, said multiplexer having an output outputting byte wide multiplexed data;
a byte-wide parallel data bus coupled to the output of said multiplexer;
a pipeline of processing circuits coupled to said data bus;
a time wheel clock generator generating a time wheel clock having a frequency greater than the aggregate data rate; and
a clock signal generator generating a plurality of clock signals synchronous to the time wheel clock, the plurality of signals each representing a plurality of time slots that include time slots corresponding to the n number of data streams as well as a number of spare time slots, wherein the buffers utilize at least one of the clock signals to output the buffered data streams to the multiplexer for multiplexing the n streams over the byte-wide parallel data bus during the time slots corresponding to the n data streams, and a data valid generator utilizes at least one of the clock signals to generate a control signal that no valid data is present on the byte-wide parallel data bus during the spare time slots; and
said time wheel clock is supplied to said pipeline of processing circuits.

13. The apparatus according to claim 12, wherein:
said pipeline of processing circuits includes at least two circuits selected from the group consisting of a framer, a descrambler, and a pointer tracker.

14. The apparatus according to claim 12, wherein:
said apparatus includes p number of multi-stream processing apparatus, where p is an integer greater than one and said apparatus processes (n times p) STS streams.

15. The apparatus according to claim 12, further comprising:
a communication circuit coupled to said pipeline of processing circuits for communicating information among said plurality of processing circuits.

16. The apparatus according to claim 14, further comprising:
p number of communication circuits, each being coupled to a respective pipeline of circuits; and
a communication bus coupled to each of the communication circuits, wherein information is communicated among said p pipelines.

17. The apparatus according to claim 12, wherein:
said n number of STS streams are contained in a single SONET STS-n signal.

18. The apparatus according to claim 12, wherein:
said n number of STS streams are contained in multiple SONET STS-M signals, where M is a factor of n.

19. The apparatus according to claim 14, wherein:
said (n times p) streams are contained in a single SONET STS-(n times p) signal.

20. The apparatus according to claim 14, wherein:
said (n times p) streams are contained in multiple SONET STS-m signals, where m is a factor of (n times p).

21. The apparatus according to claim 12, wherein:
said apparatus is provided on a single chip.

* * * * *

UNITED STATES PATENT AND TRADEMARK OFFICE
CERTIFICATE OF CORRECTION

PATENT NO. : 7,613,213 B2
APPLICATION NO. : 11/209230
DATED : November 3, 2009
INVENTOR(S) : Yadav et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1000 days.

Signed and Sealed this

Nineteenth Day of October, 2010

David J. Kappos
*Director of the United States Patent and Trademark Office*